(No Model.)  2 Sheets—Sheet 1.
W. H. ANDREW.
Sinker for Heavy Fishing Lines.
No. 236,750.  Patented Jan. 18, 1881.
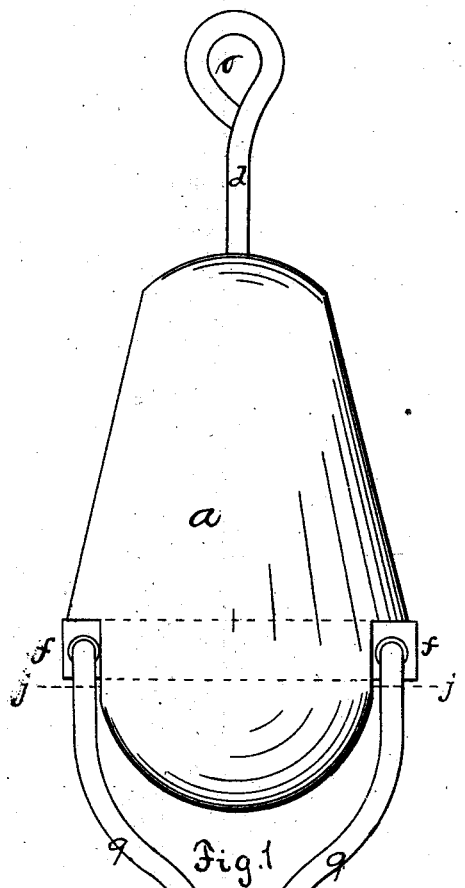
Fig. 1.
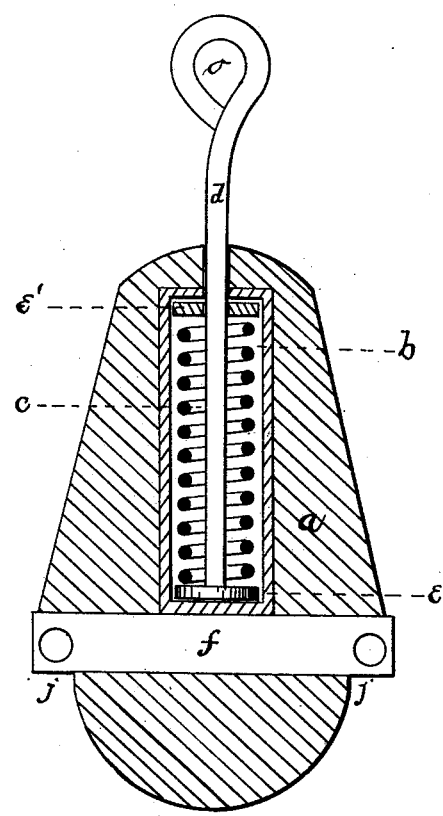
Fig. 2.
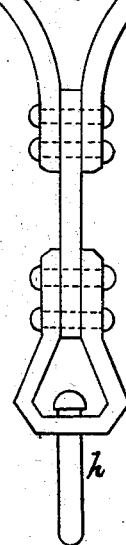
Witnesses:
Herbert G. Briggs
Frank E. Thompson
Inventor:
William H. Andrew
By his atty
Herbert G. Briggs (No Model.)
2 Sheets—Sheet 2.

W. H. ANDREW.
Sinker for Heavy Fishing Lines.

No. 236,750. Patented Jan. 18, 1881.

Witnesses:
Frank E. Thompson
Herbert G. Briggs

Inventor:
William H. Andrew
By his Atty
Herbert G. Briggs

UNITED STATES PATENT OFFICE.

WILLIAM H. ANDREW, OF PORTLAND, MAINE.

SINKER FOR HEAVY FISHING-LINES.

SPECIFICATION forming part of Letters Patent No. 236,750, dated January 18, 1881.

Application filed October 8, 1880. (No model.)

*To all whom it may concern:*

Be it known that I, WILLIAM H. ANDREW, of Portland, county of Cumberland, and State of Maine, have invented certain new and useful Improvements in Sinkers for Heavy Fishing-Lines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has relation to an improvement in leads or sinkers and snells for heavy fishing-lines; and it consists of the following ingenious and novel arrangement and adaptation of parts: The main body of the sinker is molded in the ordinary form. Inside of this sinker is cast a small cylinder which surrounds a coil of spiral spring. Running through the spring, and projecting beyond the upper part of the sinker, is a swivel-spindle to which the line is attached. At the lower end of the sinker is attached another swivel, to which the snell is fastened.

The object of this method of construction is to very materially lessen the strain upon the arms and shoulders of the fisherman when hooking fish, as well as to provide a device which will not permit the snell and line to become fouled and tangled when sinking from the surface of the water to the bottom.

That the construction and objects of my said invention may be more thoroughly understood, reference is hereby made to the subjoined specification, in which they are fully described and explained; also to the accompanying drawings, in which similar letters of reference indicate same parts.

Figure 3:
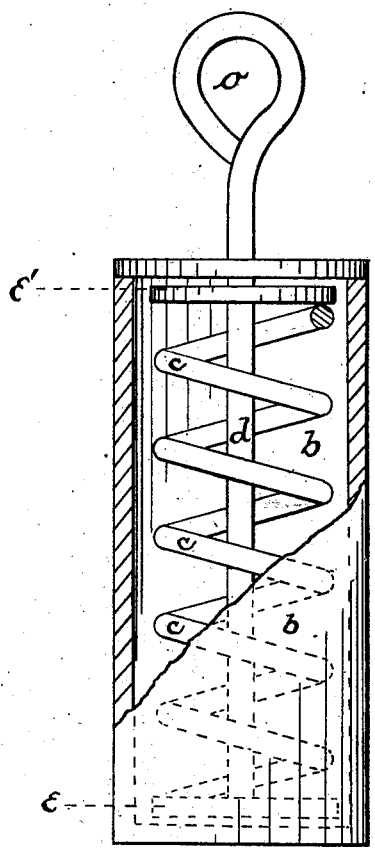
Figure 4:
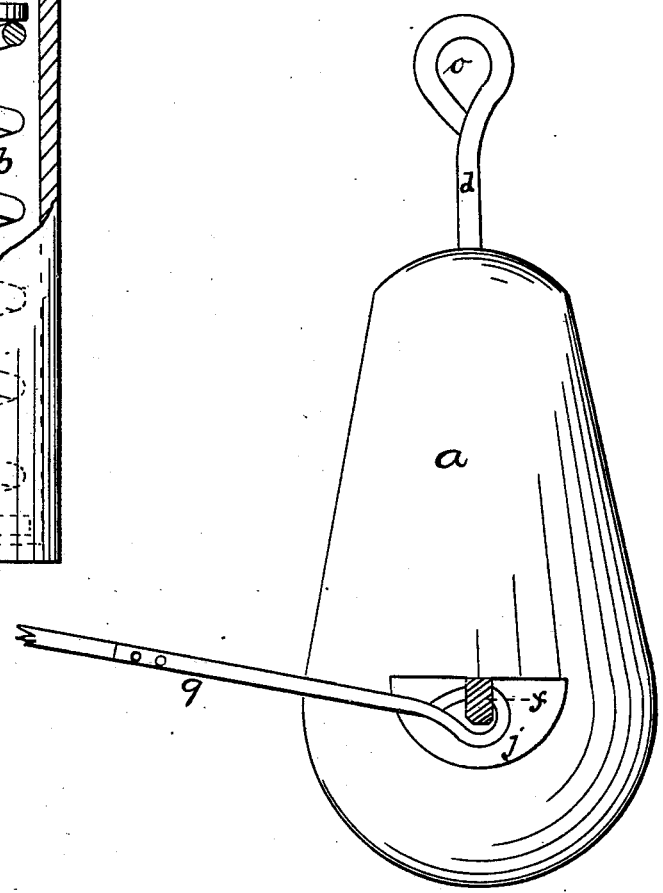

Figure 1 shows sinker and attachments. Fig. 2 is a longitudinal sectional view. Fig. 3 represents a detail of cylinder, spring, and line-swivel. Fig. 4 shows position of device when sinking.

$a$ represents the main body of the sinker. The cylinder, which is cast inside of the same, is shown by $b$. Inclosed by the cylinder is seen the coil of spiral spring $c$. Through the center of $c$ is passed a swivel-spindle, $d$, which projects to any convenient distance beyond the sinker and has an eye or loop, $o$, into which the line is tied. This spindle is provided with two washers, $e$ and $e'$. $e$ is made solid upon the end of the spindle, and is thus made that there shall be no danger of the spindle pulling out when subjected to a sudden or heavy strain. The washer $e$ further acts as a suitable base-piece to prevent the ends of the spindle and spring from wearing upon the end of the cylinder. $e'$ is made free upon the spindle, and protects the other end of the cylinder when the spring is pressed toward it, at the same time allowing the spindle to move up and down, when necessary.

Near the lower end of the bulb of the sinker, and cast into it, is a cross-bar, $f$. Into the ends of this bar are locked the ends of a bail or handle, $g$, by a method similar to that of locking together the bail and ears of an ordinary water-bucket. A swivel, $h$, is attached to the bail $g$. To this is fastened the snell.

It will be observed, by reference to the drawings, that at the lower end of the sinker, where the cross-bar is located, notches or shoulders $j$ are cut. The object of the notches is that when the line is being run out the device will take the position shown in Fig. 4. The two arms of the bail $g$ will press against the lower parts of $j$ and stand off at right-angles from the sinker. Thus the hook will be kept trailing away from the line, and all danger of fouling or tangling the snell and main line will be overcome.

The operation of my invention is very simple. When the baited hook at the end of the snell has been seized by a fish, the tendency will be to compress the spiral spring and create a steady but gradually increasing strain upon the line. There will be no sudden jerking, either upon the mouth of the fish or the arms of the fisherman. The elongating and compressing of the spring will necessarily act to keep the barb of the hook firmly embedded in the flesh of the fish, thus preventing the hook from being torn away from the fish's gills or jaws, as is liable to be the case when a sudden jerk or quick pull is made, such as fishermen usually give when they feel a fish nibbling or biting. When a large fish is hooked the strain upon the arms is very materially decreased by the fact that the spring relieves the suddenness and intensity of the pull.

Hitherto when springs have been placed in sinkers the aperture or opening for them has been so nearly open-mouthed as to admit quite freely mud or any obstruction to clog or injure the spring and prevent its action; so, also, the walls of the aperture not being in any way protected, there was danger of the spring wearing it away. I have overcome these difficulties, and have produced a very durable and efficient device in the invention, as heretofore explained.

What I claim as my invention, and desire to secure by Letters Patent, is—

1. A fishing-line sinker having a hollow cylinder within it entirely surrounded by the lead, and provided with washers, between which is fitted a spring, and to the lower washer is fixed one end of a movable rod, the outer end of which is adapted for the attachment of the fishing-line, whereby the lead of the sinker is protected from wear, substantially as and for the purposes set forth.

2. In a lead or sinker, made as described, the cross-bar $f$ and shoulders $j$, in combination with the bail $g$ and swivel $h$, substantially as and for the purposes herein described.

In testimony that I claim the foregoing as my own I affix my signature in the presence of two witnesses.

WILLIAM H. ANDREW.

Witnesses:
　GEO. H. MARQUIS,
　HERBERT G. BRIGGS.